United States Patent
Qu (10) Patent No.: US 11,599,710 B2
(45) Date of Patent: Mar. 7, 2023

(54) METHOD, APPARATUS, DEVICE AND STORAGE MEDIUM FOR DETERMINING PAGE THEME

(71) Applicant: Beijing Baidu Netcom Science and Technology Co., Ltd., Beijing (CN)

(72) Inventor: Da Qu, Beijing (CN)

(73) Assignee: Beijing Baidu Netcom Science and Technology Co., Ltd.

( * ) Notice: Subject to any disclaimer, the term of this patent is extended or adjusted under 35 U.S.C. 154(b) by 0 days.

(21) Appl. No.: 17/213,447

(22) Filed: Mar. 26, 2021

(65) Prior Publication Data
US 2021/0216701 A1 Jul. 15, 2021

(51) Int. Cl.
*G06F 40/154* (2020.01)
*G06F 16/955* (2019.01)
*G06F 16/958* (2019.01)
*G06F 40/166* (2020.01)
*G06F 40/143* (2020.01)

(52) U.S. Cl.
CPC .......... *G06F 40/154* (2020.01); *G06F 16/955* (2019.01); *G06F 16/986* (2019.01); *G06F 40/143* (2020.01); *G06F 40/166* (2020.01)

(58) Field of Classification Search
None
See application file for complete search history.

(56) References Cited

U.S. PATENT DOCUMENTS

| 7,694,229 | B2* | 4/2010 | Stoakley | G06F 9/451 715/762 |
| 7,900,137 | B2* | 3/2011 | Ivarsoy | G06F 16/9577 715/238 |
| 10,949,439 | B2* | 3/2021 | Liu | G06F 16/248 |
| 2001/0045961 | A1* | 11/2001 | Stoakley | G06F 9/451 715/744 |
| 2005/0097444 | A1* | 5/2005 | Ivarsey | G06F 16/9577 715/255 |
| 2007/0192716 | A1* | 8/2007 | Hamada | G06F 40/166 715/764 |
| 2011/0066733 | A1* | 3/2011 | Hashimoto | G06F 16/9574 709/227 |

(Continued)

OTHER PUBLICATIONS

D. Hermes "Styles, Themes, and CSS," Chapter 4, Building Xamarin Forms Mobile Apps Using XAML, 2019, pp. 119-185.*

(Continued)

*Primary Examiner* — Maikhanh Nguyen
(74) *Attorney, Agent, or Firm* — Weaver Austin Villeneuve & Sampson LLP (57) ABSTRACT

A method, apparatus, device, and storage medium for determining a page theme are provided. The method may include: acquiring a current operating environment of a target page; determining a target theme that matches the current operating environment; searching for a target style resource link matching the target theme from a database in which style resource links corresponding to different themes are pre-stored; loading a CSS variable value in the target style resource link onto the target page, wherein the CSS variable value in the target style resource link is used to indicate, among styles of the target page, a style that is changed at the time of switching the themes.

12 Claims, 5 Drawing Sheets

(56) References Cited

U.S. PATENT DOCUMENTS

| | | | |
|---|---|---|---|
| 2014/0082468 A1* | 3/2014 | May | G06F 16/951 |
| | | | 715/205 |
| 2015/0106695 A1* | 4/2015 | Antipa | G06F 40/154 |
| | | | 715/235 |
| 2015/0193388 A1 | 7/2015 | Cornet | |
| 2015/0212988 A1* | 7/2015 | Ogawa | G06F 40/143 |
| | | | 715/234 |
| 2017/0084202 A1* | 3/2017 | Blitzstein | G06F 16/9566 |
| 2017/0371974 A1* | 12/2017 | Liu | G06F 16/957 |
| 2018/0196855 A1* | 7/2018 | Liu | G06F 16/248 |

OTHER PUBLICATIONS

European Search Report dated Sep. 7, 2021 issued in EP Application No. 21164599.9.

* cited by examiner

METHOD, APPARATUS, DEVICE AND STORAGE MEDIUM FOR DETERMINING PAGE THEME

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

The present disclosure relates to a field of computer technologies, in particular, to a field of interface generation technologies, and more particularly, to a method, apparatus, device, and storage medium for determining a page theme.

BACKGROUND

With the spread of IOS13 (International Organization for Standardization 13) dark mode, the H5 (HTML5, HyperText Mark-up Language5) page is required to support a presentation of both theme of light and theme of dark. In the dark mode, the page needs to be correspondingly switched to the theme of dark. In the non-dark mode, the page needs to be correspondingly switched to the theme of light. Therefore, it is desirable to provide a method of determining a page theme to quickly switch themes corresponding to an operating environment.

In the related art, a plurality of sets of CSS (Cascading Style Sheets) style files are written and the page themes are switched by switching different CSS style files; alternatively, the page themes are switched by compiling the front-end page themes when the LES (Leaner Style Sheets) operates.

SUMMARY

There are provided a method, apparatus, device and storage medium for determining a page theme.

According to a first aspect, there is provided a method of determining a page theme, comprising: acquiring a current operating environment of a target page; determining a target theme that matches the current operating environment; searching for a target style resource link matching the target theme from a style resource link database, where the style resource link database pre-stores style resource links corresponding to different themes; loading a CSS variable value in the target style resource link onto the target page to obtain the target theme, where the CSS variable value in the target style resource link is used to indicate, among styles of the target page, a style that is changed at the time of switching the themes.

According to a second aspect, there is provided an apparatus for determining a page theme, comprising: an acquisition module configured to acquire a target page current operating environment; a determination module configured to determine a target theme that matches the current operating environment; a searching module configured to search for a target style resource link matching the target theme from a database pre-stored with style resource links corresponding to different themes; a first loading module configured to load a CSS variable value in the target style resource link onto the target page to obtain the target theme, where the CSS variable value in the target style resource link is used to indicate, the styles of the target page, a style that is changed at the time of switching the themes.

It shall be understood that the description in this section does not intend to identify key or critical features of embodiments of the present disclosure, nor does it intend to limit the scope of the present disclosure. Other features of the present disclosure will become readily apparent from the following description.

BRIEF DESCRIPTION OF THE DRAWINGS

The drawings intend to provide a better understanding of the present disclosures and are not to be construed as limiting the disclosure.

DETAILED DESCRIPTION

Example embodiments of the present disclosure are described below in connection with the accompanying drawings, in which various details of the embodiments of the present disclosure are included to facilitate understanding, and are to be considered as example only. Accordingly, ordinary skilled in this art will recognize that various changes and modifications may be made to the embodiments described herein without departing from the scope and spirit of the present disclosure. Also, for clarity and conciseness, descriptions of well-known functions and structures are omitted in the following description.

According to the existing technology, the page theme is switched by switching different CSS style files and there are too many redundant elements in the style files as well as a large volume of files, resulting in a long switching time, and the switching experience is not smooth. However, according to the technical solution of the present disclosure, the page theme switching may be completed by loading the CSS variable value in the target style resource link on the target page at the time of switching the themes. The CSS variable value indicates a style that is changed when the themes are switched, without too many redundant elements participating, increasing the switching speed and thus making the switching smoother.

Figure 1:
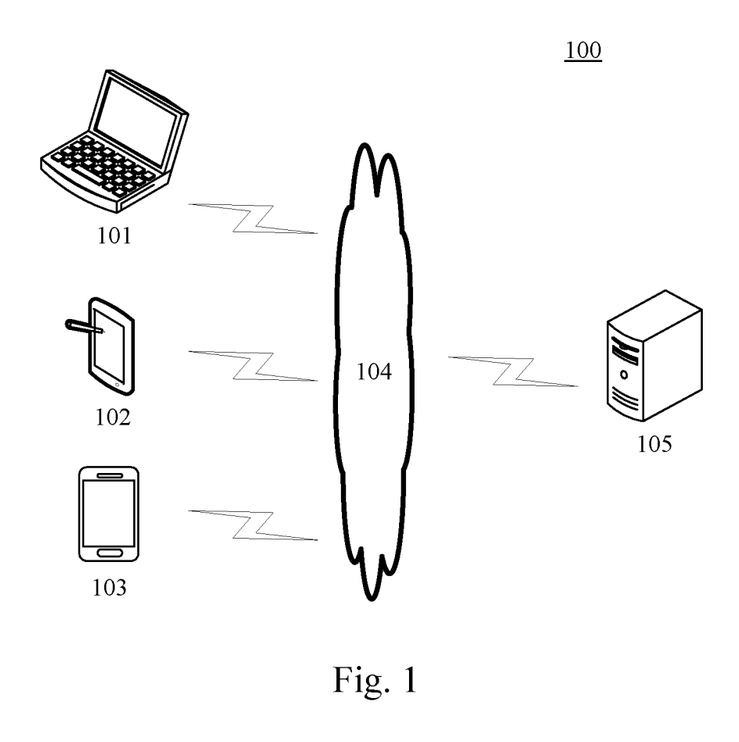
FIG. 1 is an example system architecture diagram of the systems to which some embodiments of the present disclosure may be applied.

FIG. 1 illustrates an example system architecture 100 in which a method and apparatus for determining a page theme according to embodiments of the present disclosure may be applied.

As illustrated in FIG. 1, the system architecture 100 may comprise terminal devices 101, 102, 103, a network 104, and a server 105. The network 104 serves as a medium for providing a communication link between the terminal devices 101, 102, 103 and the server 105. The network 104 may include various types of connections, such as wired, wireless communication links, or fiber optic cables, or the like.

A user may use the terminal devices 101, 102, 103 to interact with the server 105 through the network 104 to receive or send messages. Various applications may be installed into the terminal devices 101, 102, 103, such as various client applications, multi-party interactive applications, artificial intelligence applications, and the like.

The terminal devices 101, 102, 103 may be formed by hardware or software. The terminal devices 101, 102, 103 are formed by hardware, they may be various electronic devices for supporting a document processing application, which include but are not limited to an intelligent terminal, a tablet computer, a laptop computer, a desktop computer, and the like. Where the terminal devices 101, 102, and 103 are formed by software, they may be installed into the electronic devices listed above. They may be implemented, for example, as a plurality of software or software modules for providing distributed services, or as a single software or software module. It is not specifically limited herein.

The server 105 may be a server providing various services, such as a background server providing a support to the terminal devices 101, 102, 103. The background server may perform, for example, analyzing the received data such as request, and feeding the analyzed result back to the terminal devices.

It should be noted that the server may be formed by hardware or software. Where the server is formed by hardware, it may be implemented as a distributed server cluster composed of multiple servers, or may be implemented as a single server. Where the server is software, it may be implemented, for example, as a plurality of software or software modules for providing distributed services, or it may be implemented as a single software or software module. It is not specifically limited herein.

In practice, the method for determining the page theme provided in the embodiments of the present disclosure may be performed by the terminal devices 101, 102, 103 or the server 105, and the apparatus for determining the page theme may also be provided in the terminal devices 101, 102, 103 or the server 105.

It shall be understood that the number of terminal devices, networks and the number of servers in FIG. 1 are merely illustrative. There may be any number of terminal devices, networks, and servers as desired for implementation.

According to the existing technology for switching the page theme, one solution is to write a plurality of sets of CSS style files, and the page theme is switched by switching different CSS style files. A disadvantage of the solution is that there are too many redundant elements in different style files, and the files are large in size, so that the switching time is long and the switching experience is not smooth. Another solution is to compile and build front-end page theme when the LESS operates. A disadvantage of this scheme is that the compilation time is long, resulting in an unsmooth switching experience.

Figure 2:
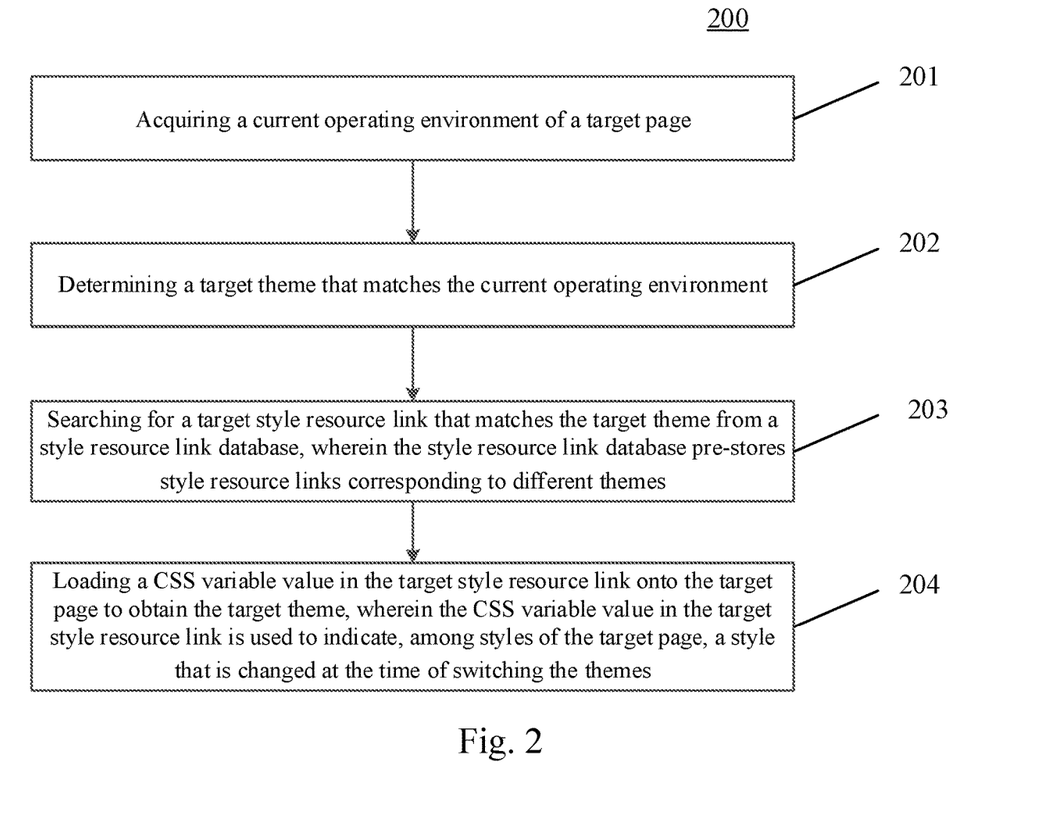
FIG. 2 is a flowchart of a method for determining a page theme according to embodiments of the present disclosure.

Referring to FIG. 2, there is illustrated a flow 200 of a method for determining a page theme in accordance with embodiments of the present disclosure. The method for determining the page theme comprises the following steps.

S201, acquiring a current operating environment of a target page.

In the present embodiment, the execution entity (for example, a terminal or a server illustrated in FIG. 1) of the method for determining the page theme may acquire the current operating environment of the target page. Alternatively, the execution entity may acquire, from other electronic devices than the above-mentioned execution entity, a target theme matching the current operating environment.

The target page may refer to a page to be presented to a user. For example, when a user wants to search for a keyword, the home page of a browser may be a target page when the browser is opened. When a search engine page is accessed from the first page of the browser, the search engine page may serve as the target page. When a keyword is input for a query, the result display page may be the target page.

The current operating environment may be an automatically adaptive operating environment or the operating environments may be autonomously selected to be switched for the user, for example, the operating environment may be a dark mode, a daytime mode, a night mode, or the like. The method for acquiring the current operating environment of the target page may be the conventional method or a technology to be developed in the future, which is not limited in the present disclosure. For example, the current operating environment of the target page may be implemented by programming in a JavaScript language, and the current operating environment of the target page may be implemented by crawling technology or by acquiring data in the target page by an applet having captured data.

S202, determining a target theme that matches the current operating environment.

In this embodiment, an execution entity (for example, a terminal or a server illustrated in FIG. 1) of the method for determining the page theme may determine the target theme that matches the current operating environment. The method for determining the target theme to be matched with the current operating environment may be the conventional method in the prior art or a future developed technology in the future, and this disclosure is not limited thereto.

For example, a table is used to pre-store correspondences between the operating environments and the themes, in which each operating environment has a corresponding theme, for example, a dark mode corresponds to a theme of dark, a day mode corresponds to a day theme, and a night mode corresponds to a night theme. After determining the current operating environment, the theme corresponding to the current operating environment may be found in the correspondence table as the target theme.

For another example, a model, which outputs a corresponding theme according to an operating environment, may also be employed to predict the target theme that matches the current operating environment.

S203, searching for a target style resource link that matches the target theme from a style resource link database, where the style resource link database pre-stores style resource links corresponding to different themes.

In this embodiment, a style resource link refers to a link to a style resource. The style resource includes a variable definition statement including a variable name and a variable value indicating the content of the variable name (i.e., a CSS variable value). The execution entity for the method of determining the page theme (such as the terminal or server illustrated in FIG. 1) may search for the target style resource link that matches the target theme, from the styles resource link database. Alternatively, the style resource link database may be stored in other electronic devices outside the execution entity or in the locally execution entity.

It shall be understood that different themes correspond to different style resource links. The target style resource link may refer to a style resource link corresponding to the target theme. The method, which the execution entity uses to search for the target style resource link matching the target theme, may be the conventional method in the prior art or may be implemented with the future development technology, and this disclosure is not limited thereto.

For example, a link name of a style resource link corresponding to a different theme and pre-stored in the style resource link database may include a theme name, and an execution entity may determine the style resource link of the target theme, which is included in the theme name of the link name, as a target style resource link matching the target theme.

S204, loading a CSS variable value in the target style resource link onto the target page to obtain the target theme, where the CSS variable value in the target style resource link is used to indicate, among styles of the target page, a style that is changed at the time of switching the themes.

In this embodiment, the execution entity of the method for determining the page theme may load the CSS variable value in the target style resource link onto the target page, and further present the target theme on the target page.

Further, the CSS variable value in the target style resource link may be loaded into the corresponding CSS variable, which corresponds to a style of the styles of the target page, which is changed at the time of switching the themes.

The style resource pointed to by the target style resource link includes a variable definition statement including a variable name and a variable value indicating the content of the variable name (i.e., a CSS variable value). The CSS variable may include an attribute name and an attribute value, where the attribute value uses the function var ( ) to invoke the variable name in the variable definition statement to obtain the variable value.

After loading the target style resource link onto the target page, the attribute value in the CSS variable is changed according to the variable value. When the attribute value in the CSS variable is changed, the page style is changed accordingly, that is, the theme of the target page is switched to the target theme.

For example, the CSS variable may be in the form of:

```
.box{
    color: var (--textcolor) ;
}
```

The variable definition statement in the target style resource link may be in the form of:

```
:root{
    --textcolor: red;
}
```

In this example, "box" and "root" are the labels that indicate the category of the statement. The variable value, which defines the variable name "--textcolor" in the variable definition statement, is "red", indicating that the text color is red. "Color" is the attribute name and indicates that the CSS variable is used to indicate the color attribute in the page style. "var (--textcolor)" is an attribute value by invoking the function var ( ) with the variable name "--textcolor" to obtain the variable value "red". After loading the target style resource link onto the target page, the text color of the target page is displayed in red.

The style that is changed at the time of switching the themes may refer to such style, according to which an attribute in the page is changed during the page theme switching. For example, the background color is changed at the time of switching the themes, the background color may be used as a style that is changed at the time of switching the themes. For another example, if the font color is changed at the time of switching the themes, the font color may be used as the style changed at the time of switching the themes.

It shall be understood that the style of the target page may comprise a style that is not changed at the time of switching the themes, for example, a font size of a text, a font name of a text, and the like, in addition to the style changed at the time of switching the themes.

In summary, according to the method for determining a page theme provided in this embodiment, the execution entity may acquire the current operating environment of the target page, determine a matched target theme according to the current operating environment, and then load a target style resource link matched with the target theme for purpose of switching the themes. It may present the theme adapted to the current operating environment to the user without providing theme switching instructions, thereby improving user experience. Moreover, when switching the themes, the loaded target style resource link includes only the CSS variable value for indicating the style changed at the time of switching the themes from the style of the target page. When the CSS variable value is loaded, only a part of the style of the target page will be changed, and the amount of the loaded data is significantly reduced compared with the CSS style table including all the style resources of the target page, thereby increasing the loading speed, reducing the time for switching theme, and further improving the switching speed and fluency.

Figure 3:
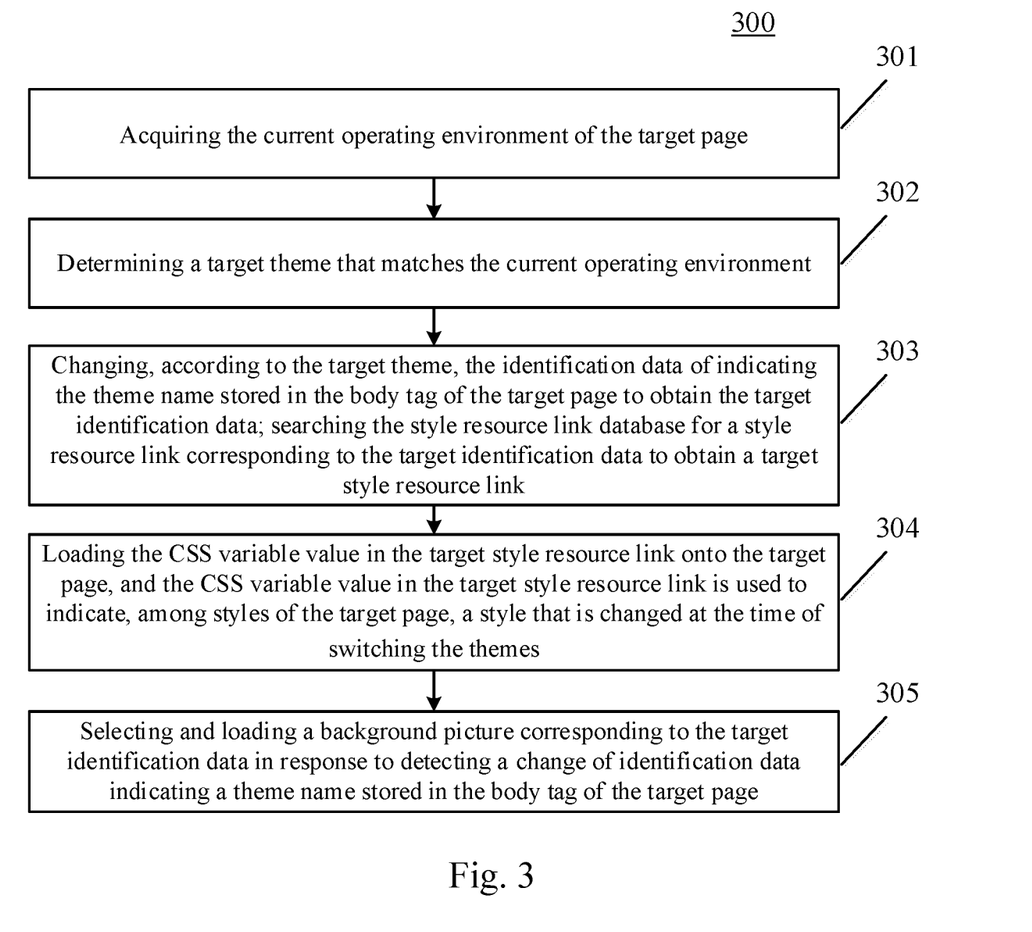
FIG. 3 is a flowchart of a method for determining a page theme according to another embodiment of the present disclosure.

Referring to FIG. 3, there is illustrated a flow 300 of a method of determining a page theme in accordance with another embodiment of the present disclosure. The method for determining a page theme includes the following steps.

S301, acquiring the current operating environment of the target page.

In this embodiment, the execution entity of the method for determining the page (for example, the terminal or server illustrated in FIG. 1) may acquire the current operating environment of the target page. Alternatively, the execution entity may obtain the current operating environment of the target page from other electronic devices than the execution entity or locally.

The target page may refer to a page to be presented to the user. For example, when the user wants to search for a keyword, the browser home page may be used as the target page when the browser is opened; after entering the search engine page from the first page of the browser, the search engine page may be used as a target page; after the keyword is input for query, the result display page may be a target page or the like.

The current operating environment may be an operating environment that is automatically adapted inside the terminal device or operating environments that may be autonomously selected to be switched by a user. For example, the operating environment may be a dark mode, a daytime mode, a night mode, or the like. The method of acquiring the current operating environment of the target page may be the conventional method in the prior art or may be implemented with the future development technology, and this disclosure is not limited thereto.

S302, determining a target theme that matches the current operating environment.

In this embodiment, the execution entity of the method for determining the page theme may determine the target theme that matches the current operating environment. The method for determining the target theme to be matched with the current operating environment may be the conventional method in the prior art or may be implemented with the future development technology, and this disclosure is not limited thereto.

S303, changing, according to the target theme, the identification data of indicating the theme name stored in the body tag of the target page to obtain the target identification data; searching the style resource link database for a style resource link corresponding to the target identification data to obtain a target style resource link.

In this embodiment, a style resource link refers to a link to a style resource. The style resource includes a variable definition statement including a variable name and a variable value indicating the content of the variable name (i.e., a CSS variable value). The execution entity of the method for determining the page theme (for example, the terminal or server illustrated in FIG. 1) may change the identification data for indicating the theme name stored in the body tag of the target page according to the target theme to obtain the target identification data. Then, the execution entity of the method for determining the page theme (for example, the terminal or server shown in FIG. 1) may search for the style resource link corresponding to the target identification data from the style resource link database, to obtain the target style resource link. Alternatively, the style resource link database may be stored locally in other electronic devices outside the execution entity or in the execution entity.

It shall be understood by a person skilled in this art that, the above-mentioned body tag is a tag in H5 page, the elements in the body tag define the main body of the document, and the elements in the body tag contain all the contents of the document, such as text, hyperlinks, images, tables, lists, and the like.

The identification data for indicating the theme name stored in the body tag of the target page may be in the following forms.

For example, it may be <body data-theme="dark">, where "body" is a label indicating a position, "data-theme" is theme name data, and "dark" assigns a value to the theme name data to represent the name of the theme. According to this identification data, the target theme may be determined as a theme of dark.

For example, it may be <body data-theme="light">, where "body" is a label indicating a position, "data-theme" is theme name data, and "light" assigns a value to the theme name data to represent the name of the theme. According to this identification data, the target theme may be determined as a theme of light.

For example, the process of obtaining the target identification data by changing the identification data for indicating the theme name stored in the body tag of the target page according to the target theme may be as follows:

The identification data stored in the body tag of the target page at a certain moment is <body data-theme="light">. After the execution entity determines that the target theme is a theme of dark, the identification data in the body tag is changed to <body data-theme="dark">.

In the process of searching for the style resource link corresponding to the target identification data to obtain the target style resource link, the style resource link corresponding to the target data may be selected by the CSS selector based on the form of the key-value distributed storage system.

As an example, when the target identification data is <body data-theme="light">, the corresponding style resource link "light.css" is selected by the CSS selector as the target style resource link:

```
//light.css
: root{
--textcolor:#999;
}
```

Where "light.css" is the name of the style resource link, indicating that the style resource link corresponds to a theme of light, i.e., <body data-theme="light">. "Root" means source for selection by the CSS selector. "--textcolor" is the variable name, meaning text color. "#999" is the CSS variable value, pointing to a color according to a preset rule.

As another example, when the target identification data is <body data-theme="dark">, the corresponding style resource link "dark.css" is selected by the CSS selector as the target style resource link:

```
//dark.css
: root{
--textcolor:rgba(0,0,0,0,8);
}
```

Where, "dark.css" indicates that the style resource link corresponds to a theme of dark, i.e., <body data-theme="dark">. "Root" means source for selection by the CSS selector. "--textcolor" is the variable name, meaning text color. "rgba(0,0,0,0,8)" is the CSS variable value, pointing to a color according to a preset rule.

In this step, the current theme name is indicated by the identification data in the body tag, and the target style resource link corresponding to the target theme may be quickly acquired according to the identification data during searching.

S304, loading the CSS variable value in the target style resource link onto the target page, and the CSS variable value in the target style resource link is used to indicate, among styles of the target page, a style that is changed at the time of switching the themes.

In this embodiment, the execution entity of the method for determining the page theme may load, on the target page, the CSS variable value in the target style resource link.

Further, the CSS variable value in the target style resource link may be loaded into the corresponding CSS variable, which corresponds to a style in the style of the target page that is changed at the time of switching the themes.

The style resource pointed to by the target style resource link may include a variable definition statement including a variable name and a variable value indicating the content of the variable name (i.e., a CSS variable value). The CSS variable may include an attribute name and an attribute value, where the attribute value uses the function var ( ) to invoke the variable name in the variable definition statement to obtain the variable value.

After the target style resource link is loaded onto the target page, the attribute value in the CSS variable is changed according to the variable value. When the attribute value in the CSS variable is changed, the page style is changed accordingly, that is, the theme of the target page is switched to the target theme.

In this embodiment, the operations of step S301, step S302, and step S304 are substantially the same as those of step S201, step S202, and step S204. Details are not described herein.

S305, selecting and loading a background picture corresponding to the target identification data, in response to detecting a change of identification data indicating the theme name stored in the body tag of the target page.

In this embodiment, when detecting whether the identification data for indicating the theme name stored in the body tag of the target page is changed or not, the identification data indicating the theme name stored in the body tag of the target page may be monitored by MutationObserver or HttpSessionAttributeListener.

In response to detecting a change of the identification data indicating the theme name and stored in the body tag of the target page, the executing entity of the method for determining the theme of the page may select and load the background picture corresponding to the target identification data.

In this example, the user may be provided with corresponding background pictures for selection and loading in advance for different themes, respectively, and the background pictures may be stored in a terminal or a server or the like.

Here, the execution entity may select the background picture corresponding to the target identification data through the CSS selector for loading based on the form of the key-value distributed storage system.

For example, for a page structure as follows:

```
<body data-theme="dark">
...
<i class="test-ico"></i>
...
</body>
```

Where "body" is a label for indicating a position, "data-theme" is theme name data, and "dark" is assigned to the theme name data to represent the name of the theme, according to which it may determine that the target theme is a theme of dark; "i" indicates an element, "class" indicates a tag style class, and "test-ico" indicates the name of a specific style class.

The corresponding background picture may be selected and loaded as follows:

```
body[data-theme="dark"] .test-ico {
    background: url('dark-icon.png') no-repeat;
}
.test-ico[data-theme="light"] {
    background: url('light-icon.png') no-repeat;
}
```

Where "body[data-theme="dark"].test-ico" is a style selector with the class name of "test-ico" when the theme is <body data-theme="dark">. With the style selector, the presentation style of this element in the dark mode may be defined. "Background" is a style name of the background picture. "url('dark-icon.png') no-repeat" indicates that an image resource named dark-icon.pngdark-icon.png is used as the background picture; "body[data-theme="light"].test-ico" is a style selector with the class name of test-ico when the theme is high, with which the presentation style of the element in the light mode may be defined. "background" is the style name of the background picture, and "url('light-icon.png') no-repeat" indicates that the picture resource named light-icon.png is used as the background picture.

Through this step, the background picture may be adaptively changed at the time of switching the themes, so that the intelligent degree of the theme switching is improved, and the diversified requirements of the user are met.

In summary, according to the method as provided in this embodiment, an execution entity may acquire the current operating environment of the target page, determine the matched target theme according to the current operating environment, and then load a target style resource link matched with the target theme for purpose of switching the themes. It may present the theme adapted to the current operating environment to the user without providing a theme switching instruction, thereby improving user experience. And the target style resource link loaded at the time of switching the themes includes only the CSS variable value for indicating the style changed at the time of switching the themes from the style of the target page. When the CSS variable value is loaded, only a part of the style of the target page will be changed, and the amount of the loaded data is significantly reduced compared with the CSS style table including all the style resources of the target page, thereby increasing the loading speed, reducing the time for switching the themes, and further improving the switching speed and fluency.

In addition, by changing the identification data and then searching for the target style resource link according to the target identification data, the target style resource link may be quickly obtained. The corresponding background picture may also be selected and loaded through the target identification data, so that the background picture may be replaced through the theme switching, the intelligent degree of the theme switching is improved, and more user's requirements are met.

Figure 4:
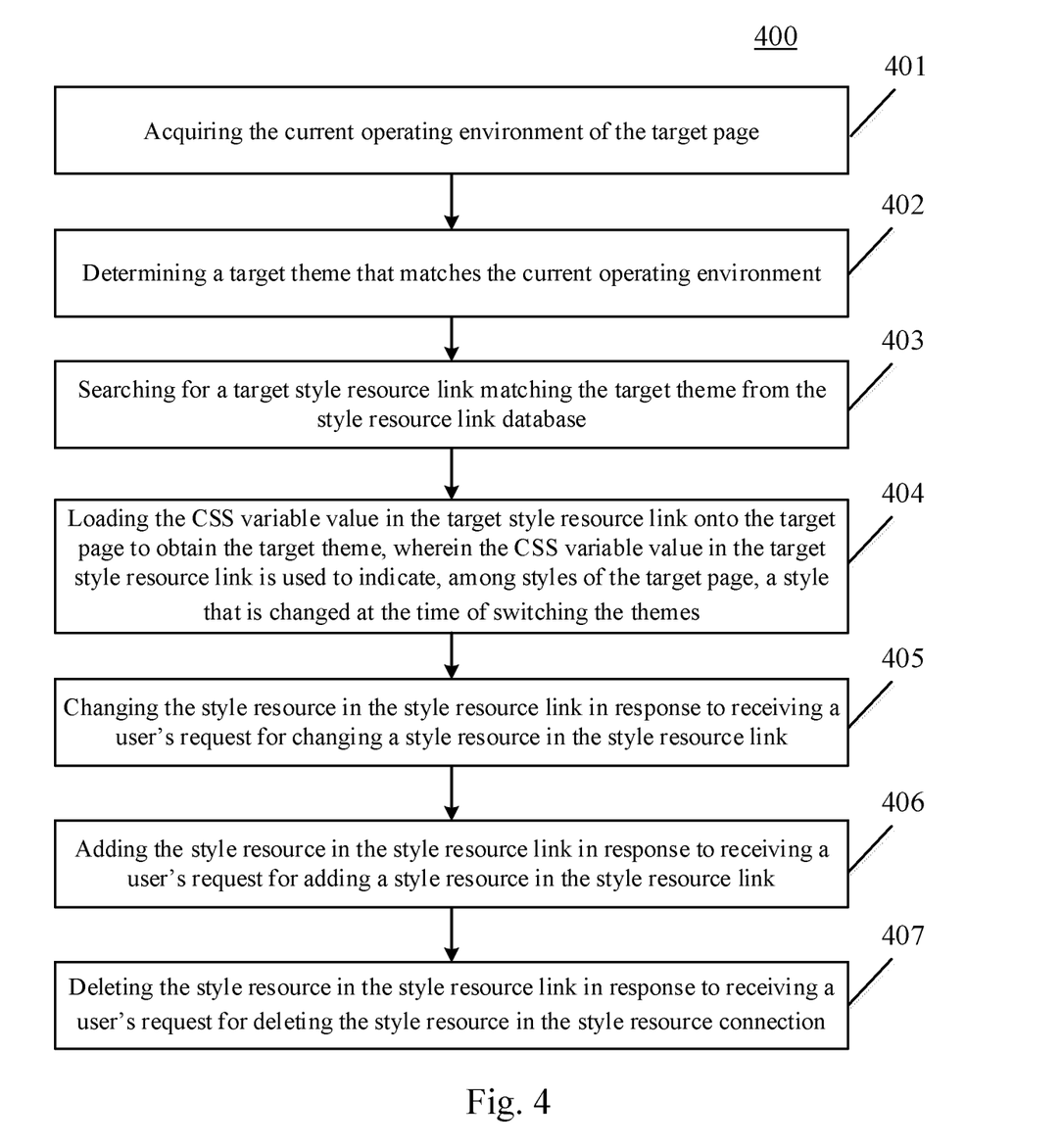
FIG. 4 is a flowchart of a method for determining a page theme according to embodiments of the present disclosure.

Referring to FIG. 4, there is shown a flow 400 of a method of determining a page theme in accordance with another embodiment of the present disclosure, the method for determining a page theme includes the steps of:

S401, obtaining the current operating environment of the target page.

In this embodiment, the execution entity of the method for determining the page theme (for example, the terminal or server shown in FIG. 1) may acquire the current operating environment of the target page. Alternatively, the execution entity may acquire, from other electronic devices other than the execution entity, a target theme matching the current operating environment.

The target page may refer to a page to be presented to a user. For example, when a user wants to search for a keyword, the browser home page may be a target page when the browser is opened. When entering the search engine page from the first page of the browser, the search engine page may serve as a target page. When a keyword is input for a query, the result display page may be a target page.

The current operating environment may be an automatically adapted operating environment or an operating environment that may be autonomously selected to be switched for the user. For example, the operating environment may be a dark mode, a daytime mode, a night mode, or the like. The method for acquiring the current operating environment of the target page may be the conventional method in the prior art or may be implemented with the future development technology, and this disclosure is not limited thereto.

S402, determining a target theme that matches the current operating environment.

In this embodiment, an execution entity of a method for determining a page theme (such as a terminal or a server shown in FIG. 1) may determine a target theme that matches a current operating environment. Alternatively, the execution entity may acquire, from other electronic devices than the execution entity, a target theme matching the current operating environment.

The method of determining the target theme to be matched with the current operating environment may be the conventional method in the prior art or may be implemented with the future development technology, and this disclosure is not limited thereto.

S403, searching for a target style resource link matching the target theme from the style resource link database. The style resource link corresponding to different themes is pre-stored in a database of style resource links.

In this embodiment, a style resource link refers to a link to a style resource. The style resource includes a variable definition statement including a variable name and a variable value indicating the content of the variable name (i.e., a CSS variable value). The execution entity of the method for determining the page theme, such as the terminal or server shown in FIG. 1, may search for the target style resource link matching the target theme from the style resource link database. Alternatively, the style resource link database may be stored locally in other electronic devices outside the execution entity or in the execution entity.

It shall be understood that different themes correspond to different style resource links. The target style resource link may refer to a style resource link corresponding to the target theme.

The method of searching for the target style resource link matching the target theme may be the conventional method in the prior art or may be implemented with the future development technology, and this disclosure is not limited thereto.

S404, loading the CSS variable value in the target style resource link onto the target page to obtain the target theme. The CSS variable value in the target style resource link is used to indicate, among the styles of the target page, a style that is changed at the time of switching the themes.

In this embodiment, the execution entity of the method for determining the page theme may load the CSS variable value in the target style resource link onto the target page, and further present the target theme on the target page.

Further, the CSS variable value in the target style resource link may be loaded into the corresponding CSS variable, which corresponds to a style in the styles of the target page, which is changed at the time of switching the themes.

The style resource pointed to by the target style resource link may include a variable definition statement including a variable name and a variable value indicating the content of the variable name (i.e., a CSS variable value). The CSS variable may include an attribute name and an attribute value, where the attribute value uses the function var ( ) to invoke the variable name in the variable definition statement to obtain the variable value.

After the target style resource link is loaded on the target page, the attribute value in the CSS variable is changed according to the variable value. When the attribute value in the CSS variable is changed, the page style is changed accordingly, that is, the theme of the target page is switched to the target theme.

In this embodiment, the operation of step S401-S404 is substantially the same as that of step S201-S204 described above, and details are not described herein.

S405, changing the style resource in the style resource link in response to receiving a user's request for changing a style resource in the style resource link.

In this embodiment, the execution entity may change the style resource in the style resource link in response to receiving a user's request for changing the style resource in the style resource link.

Changing the style resource in the style resource link may change the variable value in the variable definition statement.

For example, in response to a text color in dark mode being changed by the user,

```
//dark.css
: root{
--textcolor:rgba(0,0,0,0,8);
}
``` may be changed to:

```
/dark.css
: root{
--textcolor:rgba(0,0,0,0,9);
}
```

Where, "dark.css" is the name of the style resource link, indicating that the style resource link corresponds to the theme of dark. "Root" means source for selection by the CSS selector. "--Textcolor" is the variable name, meaning text color. "Rgba(0,0,0,0,8) and rgba(0,0,0,0,9)" are CSS variable values, each pointing to a color according to a predetermined rule.

In this way, the user may make change the style resources in the style resources link to meet the personalized needs of the user.

S406, adding the style resource in the style resource link in response to receiving a user's request for adding a style resource in the style resource link.

In this embodiment, the execution entity may add the style resource in the style resource link in response to receiving the user's request for adding the style resource in the style resource link.

Adding a style resource in the style resource link may add a variable definition statement to the style resource link.

For example, the contents of a style resource link are as follows:

```
//dark.css
: root{
--textcolor:white;
}
```

The style resource link may be added as follows:

```
//dark.css
: root{
--textcolor:white;
--bgcolor:black;
}
```

Where, "dark.css" is the name of the style resource link, indicating that the style resource link corresponds to the theme of dark. "Root" means source for selection by the CSS selector. "--Textcolor" and "--bgcolor" are variable names, meaning text color and background color, respectively, "white" and "black" are CSS variable values, respectively, the variable definition statement "--textcolor:white"

defines the text color as white, and the variable definition "--bgcolor: black" defines the background color as black.

In this way, the user may add the style resources in the style resources link to meet the personalized needs of the user.

S407, deleting the style resource in the style resource link in response to receiving a user's request for deleting the style resource in the style resource connection.

In this embodiment, the execution entity may delete the style resource in the style resource link in response to receiving a user's request for deleting the style resource in the style resource link.

Deleting a style resource in the style resource link may delete a variable definition statement in the style resource link.

For example, the contents of a style resource link are as follows:

```
//dark.css
: root{
--textcolor: white;
--bgcolor: black ;
}
```

After the style resource is deleted, the style resource link may be as follows:

```
//dark.css
: root{
--textcolor: white;
}
```

Where, "dark.css" is the name of the style resource link, indicating that the style resource link corresponds to the theme of dark. "Root" means source for selection by the CSS selector. "--Textcolor" and "--bgcolor" are variable names, meaning text color and background color, respectively. "white" and "black" are CSS variable values, respectively. The variable definition statement "--textcolorwhite" defines the text color as white, and the variable definition "--bgcolor: black" defines the background color as black.

In this way, the user may delete the style resources in the style resources link to meet the personalized requirements of the user.

In summary, according to the method for determining a page theme provided in this embodiment, an execution entity may acquire the current operating environment of the target page, determine a matched target theme according to the current operating environment, and then load a target style resource link matched with the target theme for purpose of switching the themes. It may present a theme adapted to the current operating environment to the user without giving a theme witching instruction, thereby improving user experience. Moreover, the target style resource link loaded at the time of switching the themes includes only the CSS variable value for indicating the style changed at the time of switching the themes from the style of the target page. When the CSS variable value is loaded, only a part of the style of the target page is changed, and the amount of the loaded data is significantly reduced compared with the CSS style table including all the style resources of the target page, thereby increasing the loading speed, reducing the time for switching theme, and further improving the switching speed and fluency. In addition, the user may make changes, deletions, and/or additions to the style resources in the style resources link to meet the personalized needs of the user.

Figure 5:
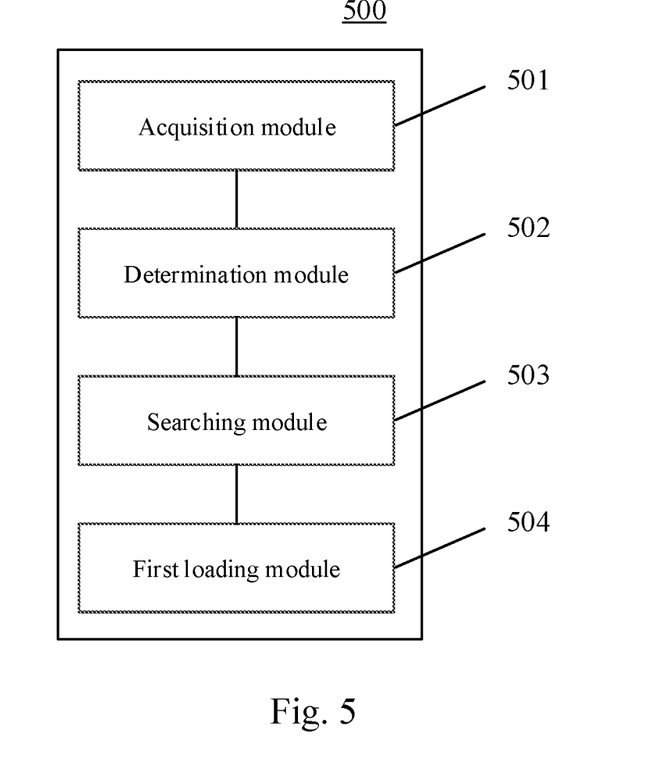
FIG. 5 is a schematic structural diagram of an apparatus for determining a page theme according to embodiments of the present disclosure.

Referring to FIG. 5, there is shown a schematic structural diagram of an apparatus for determining a page theme in accordance with embodiments of the present disclosure. The apparatus 500 for determining a page theme includes an acquisition module 501 configured to acquire a current operating environment of a target page. The determination module 502 is configured to determine a target theme that matches the current operating environment. The searching module 503 is configured to search for a target style resource link matching the target theme from the style resource link database, where the style resource link database has a style resource link corresponding to a different theme pre-stored therein. A first loading module 504 configured to load a CSS variable value in a target style resource link onto a target page to obtain the target theme. The CSS variable value in the target style resource link is used to indicate, among the styles of the target page, a style that is changed at the time of switching the themes.

According to the apparatus for determining a page theme provided in this embodiment, the current operating environment of a target page may be acquired, a matched target theme is determined according to the current operating environment, and then a target style resource link matched with the target theme is loaded for purpose of switching the themes, so that it may present a theme adapted to the current operating environment to the user without giving a theme switching instruction, thereby improving user experience. And the target style resource link loaded at the time of switching the themes includes only the CSS variable value for indicating the style changed at the time of switching the themes from the style of the target page. When the CSS variable value is loaded, only a part of the style of the target page changes, and the loading data amount is significantly reduced compared with the CSS style table including all the style resources of the target page, thereby increasing the loading speed, reducing the time for switching theme, and further improving the switching speed and fluency.

In some alternative implementations of the present embodiment, the means for determining the page theme further includes a first change module (not shown) configured to change the identification data indicating the theme name stored in the body tag of the target page according to the target theme to obtain the target identification data. The searching module 503 is further configured to search for a style resource link corresponding to the target identification data to obtain a target style resource link.

In some alternative implementations of the present embodiment, the means for determining a page theme further comprises a detection module (not shown) configured to detect identification data stored in the body tag of the target page for indicating a theme name. A second loading module (not shown) configured to select and load a background picture corresponding to the target identification data when the identification data indicating the theme name stored in the body tag of the target page is changed.

In some alternative implementations of the present embodiment, the means for determining the page theme also comprises a second change module (not shown) configured to change the style resource in the style resource link after receiving a user's request for changing the style resource in the style resource link.

In some alternative implementations of the present embodiment, the means for determining a page theme further comprises an adding module (not shown) configured to add a style resource in the style resource link after receiving a user's for adding a style resource in the style resource link. A deleting module (not shown in the figure) configured to delete the style resource in the style resource link after receiving a user's request for deleting the style resource in the style resource link.

According to an embodiment of the present disclosure, the present disclosure also provides an electronic device and a readable storage medium.

Figure 6:
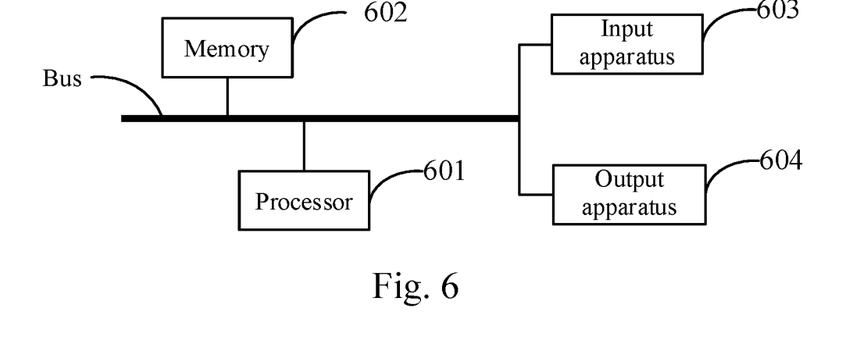
FIG. 6 is a schematic structural diagram of a computer system suitable for implementing a server or terminal according to embodiments of the present disclosure.

FIG. 6 is a block diagram of an electronic device of a method of determining a page theme according to embodiments of the present disclosure. Electronic devices are intended to represent various forms of digital computers, such as laptop computers, desktop computers, worktables, personal digital assistants, servers, blade servers, mainframe computers, and other suitable computers. Electronic devices may also represent various forms of mobile devices, such as personal digital processing, cellular telephones, smart phones, wearable devices, and other similar computing devices. The components shown herein, their connections and relationships, and their functions are by way of example only and are not intended to limit the implementation of the present disclosure as described and/or claimed herein.

As shown in FIG. 6, the electronic device includes one or more processors 601, a memory 602, and an interface for connecting components including a high speed interface and a low speed interface. The various components are interconnected by different buses and may be mounted on a common motherboard or otherwise as desired. The processor may process instructions executed within the electronic device, including instructions stored in or on a memory to display graphical information of the GUI on an external input/output apparatus, such as a display device coupled to an interface. In other embodiments, multiple processors and/or multiple buses may be used with multiple memories and multiple memories, if desired. Similarly, a plurality of electronic devices may be connected, each providing a portion of the necessary operations (e.g., as a server array, a set of blade servers, or a multiprocessor system). A processor 601 is exemplified in FIG. 6.

The memory 602 is a non-transitory computer readable storage medium provided herein. The memory stores instructions executable by at least one processor to cause the at least one processor to perform a method of determining a page theme provided herein. The non-transitory computer readable storage medium of the present disclosure stores computer instructions for causing a computer to perform the method for determining a page theme provided herein.

The memory 602, as a non-transitory computer readable storage medium, may be used to store non-transitory software programs, non-transitory computer-executable programs, and modules. The processor 601 executes various functional applications and data processing of the server by operating non-transitory software programs, instructions, and modules stored in the memory 602, that is, a method of determining a page theme in the above-described method embodiment.

The memory 602 may include a storage program area and a storage data area, where the storage program area may store an operating system, an application program required for at least one function; the storage data area may store data or the like created according to the use of the electronic device that determines the page theme. In addition, memory 602 may include high speed random access memory, and may also include non-transitory memory, such as at least one magnetic disk storage device, flash memory device, or other non-transitory solid state storage device. In some embodiments, memory 602 may optionally include remotely disposed memory relative to processor 601, which may be connected via a network to an electronic device that determines a page theme. Examples of such networks include, but are not limited to, the internet, enterprise intranets, local area networks, mobile communication networks, and combinations thereof.

The electronic device for determining the page theme may further comprise input means 603 and output means 604. The processor 601, the memory 602, the input apparatus 603, and the output apparatus 604 may be connected via a bus or otherwise, as illustrated in FIG. 6.

The input apparatus 603 may receive input number or character information, and generate key signal input related to user settings and functional control of an electronic device that determines a page theme, such as a touch screen, a keypad, a mouse, a track pad, a touch pad, a pointer bar, one or more mouse buttons, a trackball, a joystick, and the like. The output apparatus 604 may include a display device, an auxiliary lighting device (e.g., an LED), a tactile feedback device (e.g., a vibration motor), and the like. The display device may include, but is not limited to, a liquid crystal display (LCD), a light emitting diode (LED) display, and a plasma display. In some embodiments, the display device may be a touch screen.

The various embodiments of the systems and techniques described herein may be implemented in digital electronic circuit systems, integrated circuit systems, application specific ASICs (application specific integrated circuits), computer hardware, firmware, software, and/or combinations thereof. These various embodiments may include being implemented in one or more computer programs that may execute and/or interpret on a programmable system including at least one programmable processor, which may be a dedicated or general purpose programmable processor, may receive data and instructions from a memory system, at least one input apparatus, and at least one output apparatus, and transmit the data and instructions to the memory system, the at least one input apparatus, and the at least one output apparatus.

These computing programs (also referred to as programs, software, software applications, or code) include machine instructions of a programmable processor and may be implemented in high-level procedures and/or object-oriented programming languages, and/or assembly/machine languages. As used herein, the terms "machine-readable medium" and "computer readable medium" refer to any computer program product, device, and/or device (e.g., magnetic disk, optical disk, memory, programmable logic device (PLD)) for providing machine instructions and/or data to a programmable processor, including a machine-readable medium that receives machine instructions as machine-readable signals. The term "machine readable signal" refers to any signal used to provide machine instructions and/or data to a programmable processor.

To provide interaction with a user, the systems and techniques described herein may be implemented on a computer having a display device (e.g., a CRT (cathode ray tube) or LCD (liquid crystal display) monitor) for displaying information to the user; and a keyboard and a pointing device (e.g., a mouse or a trackball) through which a user may provide input to a computer. Other types of devices may also be used to provide interaction with a user. For example, the feedback provided to the user may be any form of sensory feedback (e.g., visual feedback, auditory feedback, or tactile feedback); and input from the user may be received in any form, including acoustic input, speech input, or tactile input.

The systems and techniques described herein may be implemented in a computing system including a background component (e.g., as a data server), or a computing system including a middleware component (e.g., an application server), or a computing system including a front-end component (e.g., a user computer having a graphical user interface or a web browser through which a user may interact with embodiments of the systems and techniques described herein), or a computing system including any combination of such background component, middleware component, or front-end component. The components of the system may be interconnected by any form or medium of digital data communication (e.g., a communication network). Examples of communication networks include a local area network (LAN), a wide area network (WAN), and the Internet.

The computer system may include a client and a server. The client and server are typically remote from each other and typically interact through a communication network. The relationship between the client and the server is generated by a computer program operating on the corresponding computer and having a client-server relationship with each other.

It is to be understood that the steps of reordering, adding or deleting may be performed using the various forms shown above. For example, the steps described in the present disclosure may be performed in parallel or sequentially or in a different order, so long as the desired results of the technical solution disclosed in the present disclosure may be realized, and no limitation is imposed herein.

The foregoing detailed description is not intended to limit the scope of the present invention. It shall be understood by those skilled in this art that various modifications, combinations, sub-combinations, and substitutions may be made depending on design requirements and other factors. Any modifications, equivalents, and modifications that fall within the spirit and principles of this application are intended to be included within the scope of this application.

What is claimed is:

1. A method of determining a page theme, comprising:
   acquiring a current operating environment of a target page;
   determining a target theme that matches the current operating environment;
   searching for a target style resource link matching the target theme from a style resource link database, wherein the style resource link database pre-stores style resource links corresponding to different themes;
   loading a Cascading Style Sheet (CSS) variable value in the target style resource link onto the target page to obtain the target theme, wherein the CSS variable value in the target style resource link is used to indicate, among styles of the target page, a style that is changed at the time of switching the themes, wherein the styles of the target page further comprise a style that is not changed at the time of switching the themes, the style that is not changed comprising a font size of a text and a font name of a text; and
   adding a style resource in the style resource link, in response to receiving a user's request for adding the style resource in the style resource link, and/or deleting the style resource in the style resource link in response to receiving a user's request for deleting the style resource in the style resource link.

2. The method of claim 1, further comprising:
   changing, according to the target theme, identification data indicating a theme name stored in a body tag of the target page, to obtain a target identification data;
   the searching for the target style resource link matching the target theme comprises: searching for a style resource link corresponding to the target identification data to obtain the target style resource link.

3. The method of claim 2, further comprising:
   selecting and loading a background picture corresponding to the target identification data, in response to detecting a change of the identification data indicating the theme name stored in a body tag of the target page.

4. The method of claim 1, further comprising:
   changing a style resource in the style resource link, in response to receiving a user's request for changing the style resource in the style resource link.

5. An electronic device, comprising:
   at least one processor; and
   a memory in communication with the at least one processor; wherein, the memory stores instructions executable by the at least one processor to enable the at least one processor to perform operations, the operations comprising:
   acquiring a current operating environment of a target page;
   determining a target theme that matches the current operating environment;
   searching for a target style resource link matching the target theme from a style resource link database, wherein the style resource link database pre-stores style resource links corresponding to different themes;
   loading a Cascading Style Sheet (CSS) variable value in the target style resource link onto the target page to obtain the target theme, wherein the CSS variable value in the target style resource link is used to indicate, among styles of the target page, a style that is changed at the time of switching the themes, wherein the styles of the target page further comprise a style that is not changed at the time of switching the themes, the style that is not changed comprising a font size of a text and a font name of a text; and
   adding a style resource in the style resource link, in response to receiving a user's request for adding the style resource in the style resource link, and/or deleting the style resource in the style resource link, in response to receiving a user's request for deleting the style resource in the style resource link.

6. The electronic device of claim 5, the operations further comprising:
   changing, according to the target theme, identification data indicating a theme name stored in a body tag of the target page, to obtain a target identification data;
   the searching for the target style resource link matching the target theme comprises: searching for a style resource link corresponding to the target identification data to obtain the target style resource link.

7. The electronic device of claim 6, the operations further comprising:
   selecting and loading a background picture corresponding to the target identification data, in response to detecting a change of the identification data indicating the theme name stored in a body tag of the target page.

8. The electronic device of claim 5, the operations further comprising:
  changing a style resource in the style resource link, in response to receiving a user's request for changing the style resource in the style resource link.

9. A non-transitory computer readable storage medium having stored thereon computer instructions, the computer instructions, when executed by a computer, causing the computer to perform operations, the operations comprising:
  acquiring, a current operating environment of a target page;
  determining a target theme that matches the current operating environment;
  searching for a target style resource link matching, the target theme from a style resource link database, wherein the style resource link database pre--stores style resource links corresponding to different themes;
  loading a Cascading Style Sheet (CSS) variable value in the target style resource link onto the target page to obtain the target theme, wherein the CSS variable value in the target style resource link is used to indicate, among styles of the target page, a style that is changed at the time of switching the themes, wherein the styles of the target page further comprise a style that is not changed at the time of switching the themes, the style that is not changed comprising a font size of a text and a font name of a text; and
  adding a style resource in the style resource link, in response to receiving a user's request for adding the style resource in the style resource link, and/or deleting the style resource in the style resource link, in response to receiving a user's request for deleting the style resource in the style resource connection.

10. The non-transitory computer readable storage medium of claim 9, the operations further comprising:
  changing, according to the target theme, identification data indicating a theme name stored in a body tag of the target page, to obtain a target identification data;
  the searching for the target style resource link matching the target theme comprises: searching for a style resource link corresponding to the target identification data to obtain the target style resource link.

11. The non-transitory computer readable storage medium of claim 10, the operations further comprising:
  selecting and loading a background picture corresponding to the target identification data, in response to detecting a change of the identification data indicating the theme name stored in a body tag of the target page.

12. The non-transitory computer readable storage medium of claim 9, the operations further comprising:
  changing a style resource in the style resource link, in response to receiving a user's request for changing the style resource in the style resource link.

* * * * *